April 22, 1958
W. M. BROWN ET AL
2,831,674
SPRING SUSPENSION
Filed Dec. 27, 1950
2 Sheets-Sheet 1
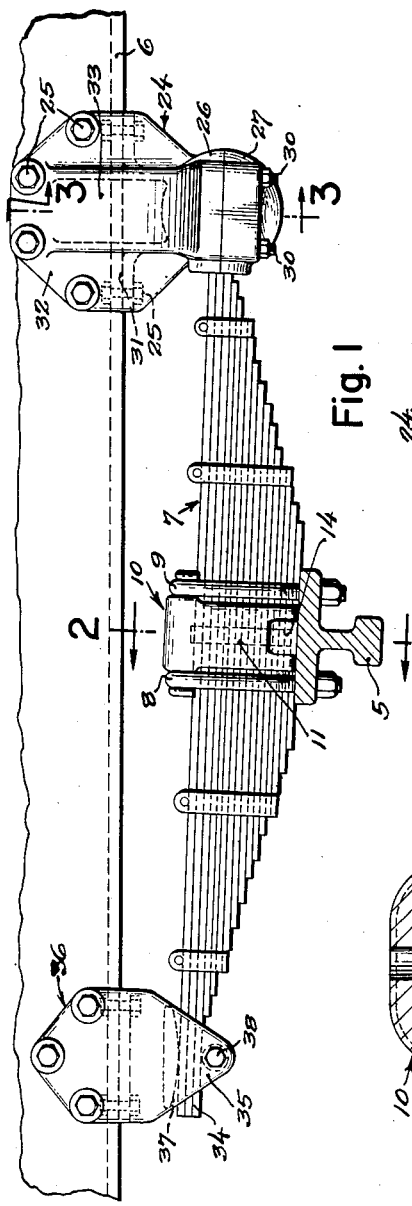
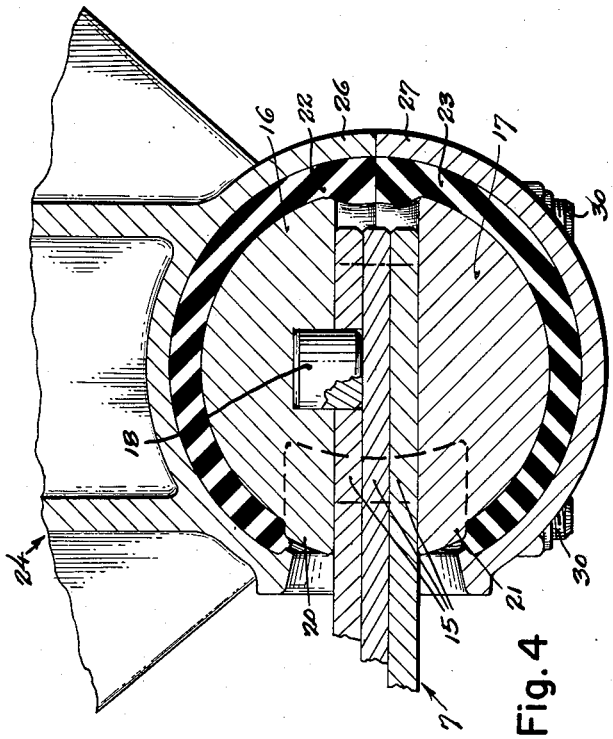
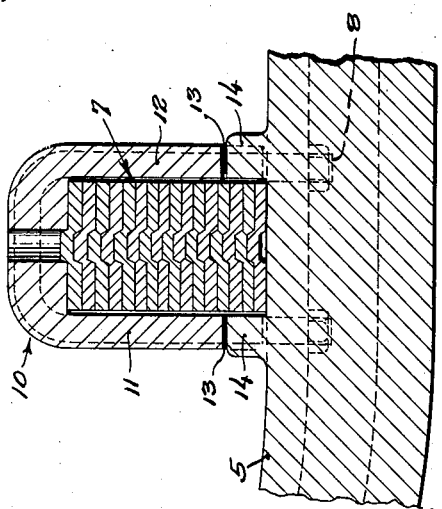
INVENTOR.
W. M. Brown
R. A. Holmstrom April 22, 1958 W. M. BROWN ET AL 2,831,674
SPRING SUSPENSION Filed Dec. 27, 1950 2 Sheets-Sheet 2

INVENTOR.
W. M. Brown
R. A. Holmstrom
BY

United States Patent Office 2,831,674
Patented Apr. 22, 1958

2,831,674

SPRING SUSPENSION

Wallace M. Brown and Robert A. Holmstrom, Seattle, Wash., assignors, by mesne assignments, to Pacific Car and Foundry Company, a corporation of Washington Application December 27, 1950, Serial No. 202,840

4 Claims. (Cl. 267—54)

This invention relates to a suspension for springing a vehicle frame from an axle, particularly a front end suspension applied between the frame and the axle-beam on which steerable front wheels are mounted, and is of that nature in which the primary springing agent comprises multiple spring leaves bound in a pile. The invention is devised with the object of adapting this type of spring to vehicles such, for example, as dirt movers which are subject to heavy-duty usage over rough terrain in which the roads to be travelled are poorly if at all defined, and aims to provide an arrangement which obviates any need for the radius rods heretofore considered a necessary adjunct to the front-end springing of dirt-moving vehicles, thus producing considerably greater flexibility while at the same time simplifying the suspension.

More particularly stated the invention has as its objects the provision of improved center and end mountings for the spring-pile, the former such as will securely anchor the spring-pile to the axle-beam and the latter such as will permit restrained motion of the spring end relative to the frame of the vehicle in a plurality of planes, namely (1) a movement in which the spring end reacts to twist forces and pivots relative to the frame about a longitudinal axis, and (2) a flexing movement in compensation of the relative vertical movement of the spring pile as the latter cushions vertical thrust, (3) a resilient localizing of the axle.

With the above and other more particular objects and advantages in view, and which will appear and be understood in the course of the following description and claims, the invention consists in the novel construction and in the adaptation and combination of parts hereinafter described and claimed.

In the accompanying drawings:

Figure 1 is a side elevational view portraying a vehicle frame connected to an axle-beam through a spring suspension constructed in accordance with the preferred embodiment of the present invention, the frame being shown fragmentarily and the axle being shown in longitudinal vertical section.

Fig. 2 is a transverse vertical section drawn to an enlarged scale on line 2—2 of Fig. 1.

Fig. 4 is a fragmentary longitudinal vertical section on line 4—4 of Fig. 3.

Figures 3, 5, 6:
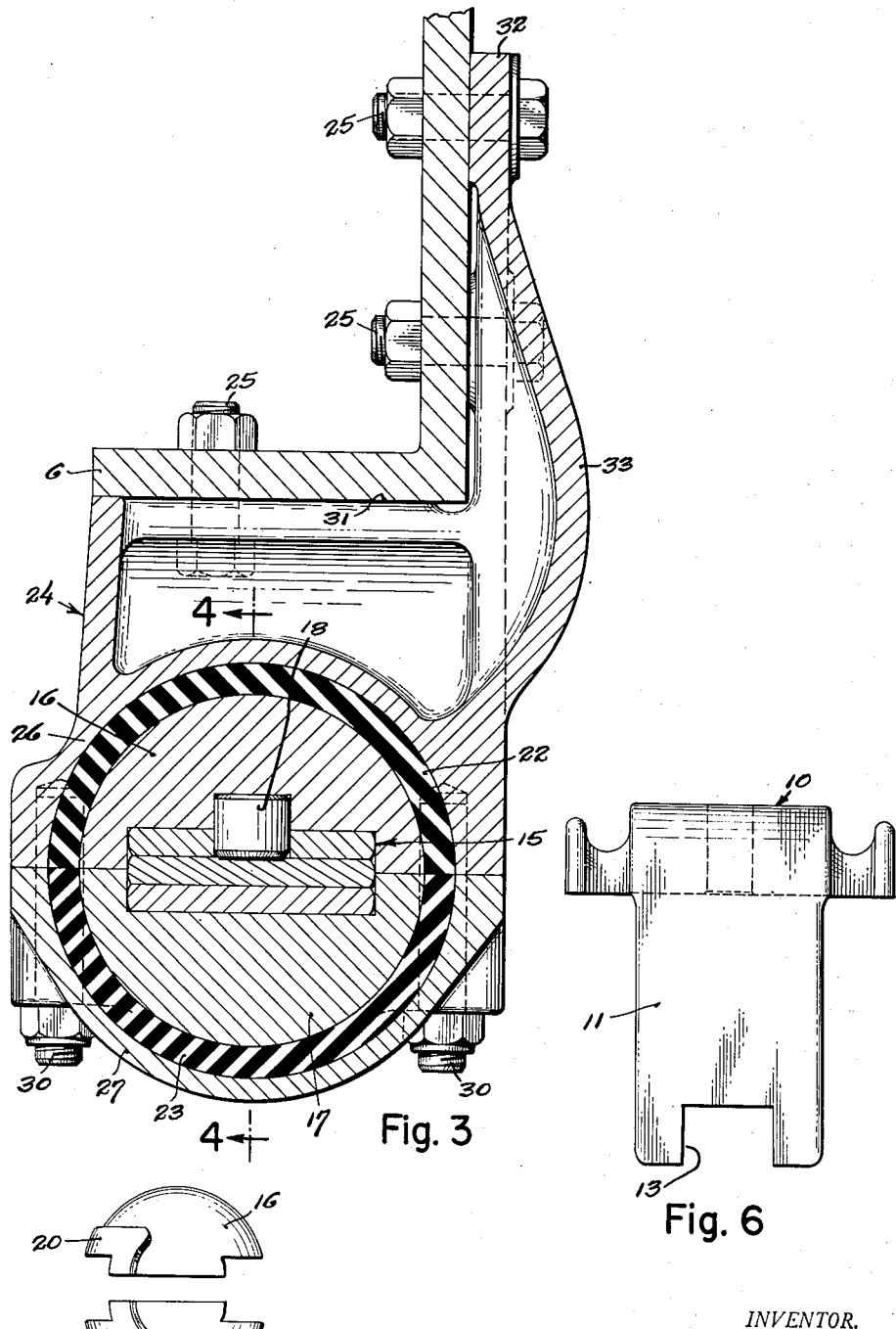
Fig. 3 is a transverse vertical section drawn to a still larger scale on line 3—3 of Fig. 1.
Fig. 5 is a side elevational view, employing a scale similar to that of Fig. 2, and illustrating the congruent halves of a ball structure shown in section in each of Figs. 3 and 4 and which is applied as an end fitting upon the spring-pile.
Fig. 6 is a side elevational view of the U-shaped cap piece through which the spring-pile is anchored to the axle-beam.

Referring to said drawing the numeral 5 denotes the axle beam which carries the steerable front wheels of an automotive vehicle, and 6 designates a channel serving as one of the two side principals of the vehicle frame. Both the illustration and the description are confined to one side only of the vehicle, like structure perforce being provided at the opposite side.

Giving support to said frame member and making connection at each of its two ends therewith there is provided a longitudinally extending pile of bound spring-leaves 7, and at its midlength said pile seats upon the axle beam and is made secure thereto by the usual U-bolts 8 and 9 which exert clamping pressure upon a cap-piece 10. The cap-piece has an inverted U-shape in end elevation to provide depending legs 11 and 12 closely confining the side edges of the pile, and there is provided at the bottom of each of said legs a re-entrant notch 13 which finds a registering fit with a respective upstanding tongue 14 cast as an integral part of the axle-beam. The several leaves in the pile are each given a punching deformation at a point central to their length so as to produce a nesting interlock in which the upstanding button of the lower leaf lodges in the mating socket of the overlying leaf, and with the button of the uppermost leaf lodging in turn in a socket presented by the saddling section of the cap-piece. Forces occasioned by endwise thrust and which would be normally resolved by the clamping bolts are countered in the present center mounting by the interlock obtaining between said tongues 14 and the notches 13.

Upon the rear end of the spring-pile, or which is to say upon the protruding laminated tongue 15 formed by several uppermost leaves thereof, there is mounted a ball-shaped fitting composed of two congruent halves 16 and 17. These half-balls are each provided in their meeting faces with registering longitudinal grooves into which the tongue fits, and socketed in the upper of the two half-balls with its lower end protruding into the groove at a point central to the width and length of the latter is a dowel 18 arranged to lodge in a registering hole drilled through the upper leaf of the tongue. The split ball has provided upon each of its halves a surface boss, as 20 and 21, so formed as to marginally define one of the end openings of the related groove, and in the application of the ball to the tongue these bosses lie to the front.

Associated with and arranged to fit upon the split-ball is an elastic rubber bushing having a substantially hemispherical shape other than for cutouts accommodating the two bosses 20 and 21, and this bushing, as with the ball, is a split element composed of congruent halves 22 and 23.

24 designates a bracket bolted, as at 25, to the frame member 6, and presented by this bracket is a pendant leg formed at its lower end with a downwardly facing cup 26. Such cup and a complementing cap 27 produce the components of a split stirrup, whose cavity is hemispherical in shape and open to the front, serving as a housing for the reception of the spring-tongue with its applied ball and ball-investing bushing 22—23. The cavity is somewhat smaller than the expanded compass of the bushing, wherefore it will be apparent that the act of taking up the bolts 30 which secure the cap in place functions to compress the elastic bushing. When so compressed, the rubber acts by its inner surface and in conjunction with the bosses 20 and 21 to firmly grip the ball and acts by its outer surface to frictionally grip the stirrup, thus permitting the spring end to partake of limited flexing and twisting motion yieldingly countered in each instance by the stress load which these motions respectively impose upon the elastic bushing. Produced as a special casting, the bracket provides a horizontal shelf 31 on which the frame member seats and at the outer side of this ledge presents a flange 32 which extends upwardly along the outer face of the frame member, such flange being reinforced by a vertical rib 33.

The connection between the frame member and the front end of the spring is a more or less conventional slip mounting in which the spring end 34 fits between pendant fork arms 35 of a bracket 36 bolted to the frame, and with its upper surface bearing upon a rub plate 37. Shown by dotted lines in Fig. 1 this rub plate is made integral with the bracket and extends as a spanner between the fork arms. A cross-bolt 38 located below the spring end serves to confine the latter.

While we have illustrated and here described our spring suspension in the form now considered to best exemplify the invention, it is self-evident that the invention admits to minor changes in its details of construction and we accordingly intend that no limitations be implied and that the hereto annexed claims be given a scope fully commensurate with the broadest interpretation which the employed language permits.

What we claim is:

1. A mounting for the end of a spring beam composed of multiple spring leaves bound in a pile with several of said leaves being prolonged at the end to produce a laminated tongue and having an exposed hole piercing at least one of the component leaves of the tongue, and comprising, in combination with the tongue, a split ball-shaped fitting composed of two congruent halves provided in their meeting faces with registering longitudinal grooves acting to produce a diametrically extending socket snugly receiving said tongue, a stud carried by one of said congruent half-balls and lodging in the hole of said tongue to secure the fitting against endwise displacement relative to the tongue, a split spherical bushing of elastic material investing said fitting, and a localized housing arranged to confine the described assembly of tongue, fitting, and bushing and comprising boltably interconnected members acting as complements of one another to define a spherical chamber of less diameter than the expanded compass of the bushing, the act of taking up on the bolts which connect said housing members bringing the contained bushing under compression.

2. A mounting for the end of a spring beam composed of multiple spring leaves bound in a pile with several of said leaves being prolonged at the end to produce a laminated tongue and comprising, in combination with the tongue, a ball-shaped fitting for the tongue comprising a pair of half-balls and presenting a diametrically disposed socket for the reception of the tongue, means securing the fitting against endwise displacement relative to the tongue, a split spherical bushing of elastic material investing said fitting, and a localized housing arranged to confine the described assembly of tongue, fitting, and bushing and comprising boltably interconnected members acting as complements of one another to define a spherical chamber of less diameter than the expanded compass of the bushing, the act of taking up on the bolts which connect said housing members bringing the contained bushing under compression, said half-balls each presenting a surface boss marginally surrounding one end of the tongue-receiving groove, the components of the split bushing being each formed with a corresponding re-entrant cut-out compensating the bushing to the surface boss of the related half-ball.

3. A mounting for the end of a spring beam composed of multiple spring leaves bound in a pile with several of said leaves being prolonged at the end to produce a laminated tongue and having an exposed hole piercing at least one of the component leaves of the tongue, and comprising, in combination with the tongue, a split ball-shaped fitting composed of two congruent halves provided in their meeting faces with registering longitudinal grooves acting to produce a diametrically extending socket snugly receiving said tongue, a stud carried by one of said congruent half-balls and lodging in the hole of said tongue to secure the fitting against endwise displacement relative to the tongue, a split spherical bushing of elastic material investing said fitting, and a localized housing arranged to confine the described assembly of tongue, fitting, and bushing comprising boltably interconnected members acting as complements of one another to define a spherical chamber of less diameter than the expanded compass of the bushing, the act of taking up on the bolts which connect said housing members bringing the contained bushing under compression, said tongue-receiving socket being open at both ends and having a length exceeding the socketed length of the tongue, thus leaving an end cavity into which a portion of the elastic bushing is crowded by the act of compressing the same.

4. A mounting for the end of a spring beam composed of multiple spring leaves bound in a pile with several of said leaves being prolonged at the end to produce a laminated tongue and having an exposed hole piercing at least one of the component leaves of the tongue, and comprising, in combination with the tongue, a split ball-shaped fitting composed of two congruent halves provided in their meeting faces with registering longitudinal grooves acting to produce a diametrically extending socket snugly receiving said tongue, a stud carried by one of said congruent half-balls and lodging in the hole of said tongue to secure the fitting against endwise displacement relative to the tongue, a split spherical bushing of elastic material investing said fitting, and a localized housing arranged to confine the described assembly of tongue, fitting, and bushing and comprising boltably interconnected members acting as complements of one another to define a spherical chamber of less diameter than the expanded compass of the bushing, the act of taking up on the bolts which connect said housing members bringing the contained bushing under compression, one of said two complements of the housing being embodied as an integral part of a cast bracket arranged to be securely bolted to the frame member of a vehicle employing said spring beam in the spring suspension.

References Cited in the file of this patent

UNITED STATES PATENTS

| | | |
|---|---|---|
| 1,404,876 | Masury et al. | Jan. 31, 1922 |
| 1,522,511 | Gleason | Jan. 13, 1925 |
| 1,540,500 | Reed | June 2, 1925 |
| 1,789,725 | Chilton | Jan. 20, 1931 |
| 1,811,514 | Matakovich | June 23, 1931 |
| 1,834,502 | Smith | Dec. 1, 1931 |
| 1,860,280 | Fletcher | May 24, 1932 |
| 2,425,138 | Venditty | Aug. 5, 1947 |
| 2,559,103 | Anderson | July 3, 1951 |

FOREIGN PATENTS

| | | |
|---|---|---|
| 717,945 | Germany | Feb. 26, 1942 |